Aug. 9, 1949. R. E. DANFORD 2,478,526
OVEN
Filed Jan. 11, 1946
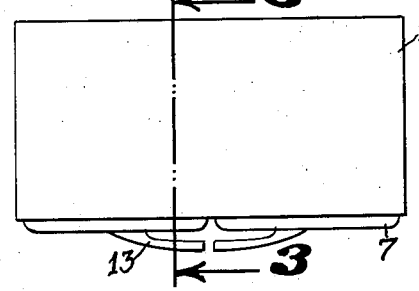
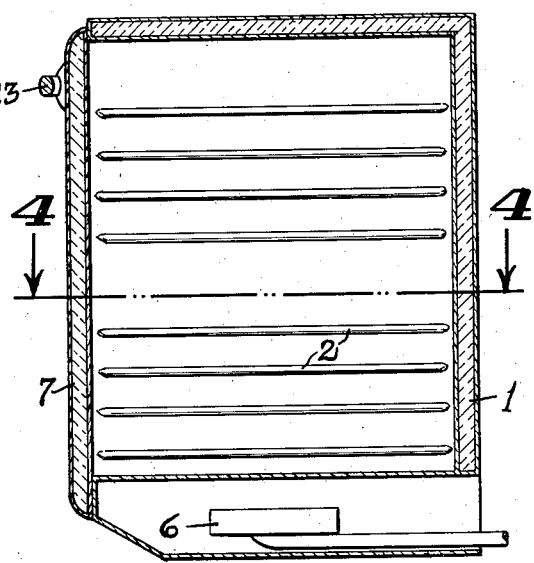
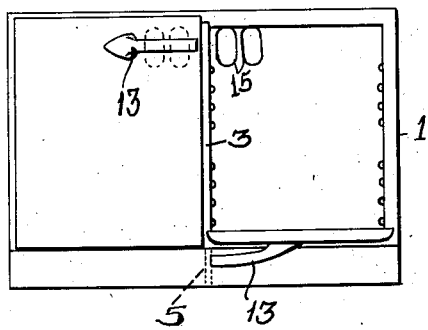
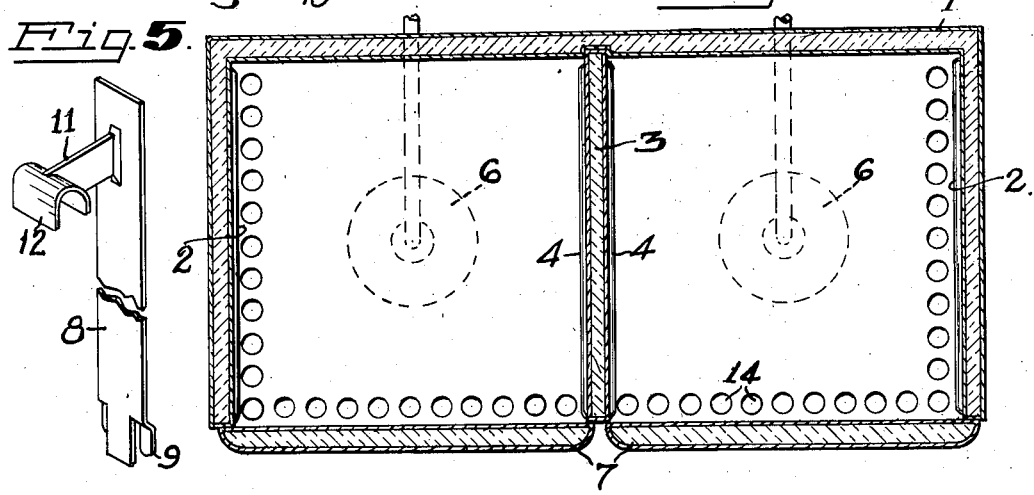
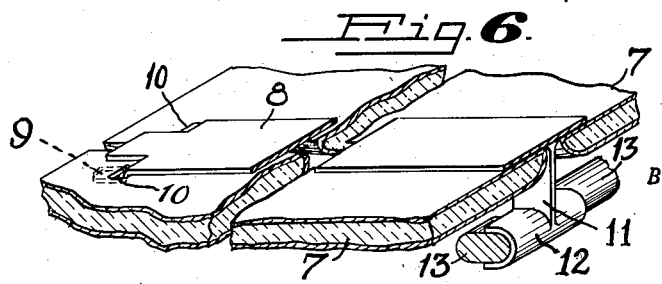
INVENTOR
Roy E. Danford
BY
J. E. Trabucco
ATTORNEY.

Patented Aug. 9, 1949

2,478,526

UNITED STATES PATENT OFFICE 2,478,526

OVEN

Roy E. Danford, San Francisco, Calif.

Application January 11, 1946, Serial No. 640,499

2 Claims. (Cl. 126—19)

This invention relates to improvements in ovens for cooking stoves or ranges.

An object of my invention is to provide an improved oven for cooking stoves embodying a large compartment which is capable of being converted into duplex ovens adapted for independent use.

Another object of my invention is to provide an improved oven structure for cooking stoves or ranges, embodying an oven space of a size capable of accommodating large roasting pans, and which may be readily converted into small half size duplex ovens adapted for independent use employing identical or widely differing temperatures, thereby permitting the simultaneous cooking of foods requiring the same or varying degrees of heat.

A further object of my invention is to provide a novel oven structure having two independently operable doors for closing the front openings of two adjacent cooking compartments which may be converted into a single large size cooking compartment having its front opening controlled by these same doors joined together and operable as a unit.

Other objects or advantages will present themselves or will be specifically pointed out in the description of my invention which is to follow.

In the accompanying drawings:

Fig. 1 is a top plan view of an oven structure embodying my invention;

Fig. 2 is a front view of the oven structure showing one of the doors in an open position;

Fig. 3 is an enlarged sectional view taken on the line 3—3 of Fig. 1;

Fig. 4 is a sectional view taken on the line 4—4 of Fig. 3;

Fig. 5 is a perspective view of the locking bar used in securing the two doors together; and Fig. 6 is a perspective view of portions of the two doors in connected together positions.

Referring to the drawings the numeral 1 designates a rectangular insulated enclosure having a longitudinal front opening. The opposite sides of the enclosure are formed with horizontally disposed pairs of projecting ribs 2 for supporting the usual oven shelves (not shown). Removably supported in suitable guide means formed on the top and bottom sides of the enclosure is a removable insulated partition 3 which is arranged in a vertical position substantially midway between the opposite side walls of the enclosure. The partition 3 divides the interior of the enclosure into two compartments of substantially equal size and shape, both open at their front ends. The partition is provided on its opposite sides with projecting ribs 4 which are horizontally arranged in positions corresponding to the relative positions of the ribs 2 on the sides of the enclosure. The ribs 2 and 4 are arranged to support shelves of suitable shape and size in each of the oven compartments, in the usual manner. When the partition is positioned in the enclosure, the two compartments formed at opposite sides thereof may be used independently of one another to cook or heat food products requiring the use of identical or widely different degrees of heat. The partition, being suitably insulated, will prevent any appreciable transfer of heat from one oven compartment to the other while either or both are in use.

At the bottom of each compartment is a longitudinally disposed shallow heating area which is preferably divided by a vertical metal partition 5 (Fig. 2) into two smaller areas which underlie the oven compartments. In each of the smaller heating areas is positioned a burner 6 which is connected in the usual manner to a source of fuel. The burners are each associated with fuel controls of the usual kind for regulating the flow of fuel thereto. When only one of the burners 6 is in operation the oven compartment directly thereabove will be heated in the usual manner, and at the same time sufficient heat will be transmitted to the other oven compartment through the metal partition 5 to permit its use as a warming oven.

When the space inside the enclosure is used as a large oven capable of accommodating large roasting pans the partition 3 is removed, thereby permitting one or more longitudinal shelves to be supported by the ribs 2 in horizontal positions.

Positioned at the front of the enclosure and arranged to close the front openings of the two compartments are hinged insulated doors 7, each adapted for independent operation. Preferably, although not necessarily, each door is mounted for vertical pivotal movement about a horizontal pivot. The inner vertical edges of the doors abut the front end of the partition 3, and similarly, the upper and outer edges of each door engages with the top and sides of the enclosure, respectively, thereby completely closing the front openings of the compartments. The inner edges of the two doors 7 are in spaced relation, thereby permitting each door to be used independently of the other when the duplex ovens or either of them is in use.

When the partition 3 is removed and the interior of the enclosure is used as a single large oven, the doors 7 are secured together and operate as a unit. So as to seal the vertical space between the inner adjacent edges of the two doors 7 a locking bar or plate 8, having its lower end formed with outwardly protruding flanges 9, is placed against the inner sides of the doors and across the intervening space. The outwardly protruding flanges 9 of a locking bar 8 engage with slots 10 formed in the inner side of a door 7 thereby securing the lower end of the bar to both doors. The upper end of the locking bar 8 is provided with an outwardly protruding member 11 which extends through the intervening space separating the doors. The outer end of the protruding member 11 is formed with a horizontal curved member 12 which engages with two spaced handles 13 secured in adjacent positions to the upper free ends of the two doors. The handles when connected to each other by the curved member 12 of the locking bar are operable as a unit, and with the upper and lower ends of the doors securely joined together they may be opened and closed as a unit to control the longitudinal opening at the front of the enclosure. The locking bar prevents the inflow of cold air into the interior of the enclosure through the intervening space between the doors.

The provision of duplex oven compartments which may be conveniently converted into a single oven of large capacity makes it possible to provide a stove having considerably less depth than those now in use. Such an advantage permits the use of stoves equipped with my improved oven structure to occupy less kitchen space.

The bottom of the enclosure 1 is provided at its side and front edges with openings 14 for the movement of heated air from the burners 6 into the oven compartments. Suitable outlets (not shown) of the usual kind are provided for the escape of the gases of combustion from the areas where the burners are housed. A number of outlets 15 allow the fumes to escape from the oven compartments.

What I claim is:

1. In an oven structure for cooking stoves, an elongated enclosure having an opening at one of its longer sides, a partition removably positioned in the enclosure for dividing the interior of the enclosure transversely into two adjacent open compartments of substantially equal areas, independently operable duplex doors arranged in spaced relationship side by side and positioned to close the openings in the compartments, and a locking bar extending longitudinally across the intervening space between the doors and having means connectible to both doors, whereby the doors may be operated as a unit to control the opening in the enclosure when the partition is removed.

2. In an oven structure for cooking stoves, an elongated enclosure having a front opening at one of its longer sides, a partition removably positioned in the enclosure for dividing the interior of the enclosure into two oven compartments, both open at their front ends, a hinged door controlling the opening of each oven compartment, the said doors being arranged for pivotal movement about substantially horizontal axes and being also arranged in adjacent but spaced relationship, a handle on each door, the said handles being positioned adjacent one another, and a locking bar extending longitudinally across the intervening space between the doors and having means connectible to the doors, whereby the two doors may be operated as a unit to control the opening in the enclosure when the partition is removed, the said locking bar having an outwardly disposed extension extending through the intervening space between the doors and engaging both door handles to hold them in locked relationship with respect to each other.

ROY E. DANFORD.

REFERENCES CITED

The following references are of record in the file of this patent:

UNITED STATES PATENTS

| Number | Name | Date |
|---|---|---|
| 320,111 | Anthony | June 16, 1885 |
| 518,903 | Stone | Apr. 24, 1894 |
| 892,187 | Schriefer | June 30, 1908 |
| 1,109,263 | Taylor | Sept. 1, 1914 |
| 1,355,868 | Trenkamp | Oct. 19, 1920 |
| 1,398,725 | Kneier | Nov. 29, 1921 |